(12) United States Patent
Penza et al.

(10) Patent No.: US 9,328,858 B2
(45) Date of Patent: May 3, 2016

(54) SYSTEM FOR EXTRACTING LIQUID FROM A PIPELINE AND METHOD FOR PRODUCING SUCH A SYSTEM

(71) Applicant: ULC ROBOTICS INC., Bay Shore, NY (US)

(72) Inventors: G. Gregory Penza, Old Field, NY (US); George Lohr, Commack, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 495 days.

(21) Appl. No.: 13/846,241

(22) Filed: Mar. 18, 2013

(65) Prior Publication Data
US 2014/0261796 A1      Sep. 18, 2014

(51) Int. Cl.
  *F16L 55/26* (2006.01)
  *G01M 3/00* (2006.01)
  *F16L 101/20* (2006.01)
  *F16L 101/30* (2006.01)

(52) U.S. Cl.
  CPC ............ *F16L 55/26* (2013.01); *F16L 2101/20* (2013.01); *F16L 2101/30* (2013.01); *Y10T 29/49826* (2015.01); *Y10T 137/8376* (2015.04)

(58) Field of Classification Search
  CPC ........... F16L 55/26; F16L 55/46; F16L 55/07; F16L 55/00; F17D 3/145; F17D 1/14; H04N 7/18; G01N 21/88; G01M 3/005
  USPC ................................ 348/84; 137/560; 29/428
  See application file for complete search history.

(56) References Cited

U.S. PATENT DOCUMENTS

| | | | | |
|---|---|---|---|---|
| 3,439,527 A | * | 4/1969 | Rohrer | 73/40.5 A |
| 3,667,359 A | * | 6/1972 | Watts | B65G 51/06 396/180 |
| 5,195,392 A | * | 3/1993 | Moore et al. | 73/866.5 |
| 6,686,950 B1 | * | 2/2004 | Caffon et al. | 348/83 |
| 6,764,536 B2 | * | 7/2004 | Welker | 96/189 |
| 6,831,679 B1 | * | 12/2004 | Olsson et al. | 348/84 |
| 6,862,945 B2 | * | 3/2005 | Chapman | F16L 55/26 73/865.8 |
| 7,150,773 B1 | * | 12/2006 | Duke | 55/418 |
| 7,551,197 B2 | * | 6/2009 | Penza et al. | 348/84 |

(Continued)

FOREIGN PATENT DOCUMENTS

| JP | 08303697 A | * | 11/1996 |
|---|---|---|---|
| JP | 2000002394 A | * | 1/2000 |

(Continued)

OTHER PUBLICATIONS

UK Search Report in Application No. GB 1404744.3, dated Sep. 26, 2014.

*Primary Examiner* — Christopher S Kelley
*Assistant Examiner* — Kathleen Walsh
(74) *Attorney, Agent, or Firm* — Brooks Kushman P.C.

(57) ABSTRACT

A system for extracting liquid from a pipeline includes a flexible elongate member having a first end and including a conduit having an intake port proximate the first end for receiving the liquid. The system also includes a camera arrangement attached to the first end of the flexible elongate member, and a connection arrangement disposed between the camera arrangement and the first end of the flexible elongate member. The connection arrangement including at least one opening in fluid communication with the intake port such that the liquid can pass through the opening and into the intake port.

12 Claims, 4 Drawing Sheets

(56) References Cited

U.S. PATENT DOCUMENTS

| | | | | |
|---|---|---|---|---|
| 2001/0017163 | A1* | 8/2001 | Penza | 138/98 |
| 2002/0170612 | A1* | 11/2002 | Penza | 138/108 |
| 2007/0051192 | A1* | 3/2007 | Penza et al. | 73/865.8 |
| 2009/0038093 | A1* | 2/2009 | Irwin | 15/104.095 |
| 2010/0208055 | A1* | 8/2010 | Olsson | H01B 7/182 348/84 |
| 2011/0169940 | A1* | 7/2011 | Babb | 348/84 |
| 2011/0175996 | A1* | 7/2011 | Penza | F16K 7/10 348/84 |
| 2012/0098955 | A1* | 4/2012 | Krywyj | 348/84 |

FOREIGN PATENT DOCUMENTS

| | | | |
|---|---|---|---|
| JP | 2000304200 | A * | 11/2000 |
| JP | 2001271982 | A * | 10/2001 |
| JP | 4259669 | B2 | 4/2009 |
| JP | 2009108885 | A * | 5/2009 |
| WO | 9314388 | A1 | 7/1993 |
| WO | WO 9314388 | A1 * | 7/1993 |

* cited by examiner

SYSTEM FOR EXTRACTING LIQUID FROM A PIPELINE AND METHOD FOR PRODUCING SUCH A SYSTEM

TECHNICAL FIELD

The present invention relates to a system for extracting liquid from a pipeline and a method for producing such a system.

BACKGROUND

Gas utility companies expend countless resources ensuring that the gas services remain present and are safely maintained for their customers. Pipe systems used for the transmission and distribution of natural gas often experience intrusion of water. This is particularly common in gas mains operating at low pressures—e.g., pipe systems pressurized to about one pound per square inch (psi) or less—due to the lack of sufficient pressure to stop water from entering the main through cracks, leaking service connections, and other leaking pipe features. Although most common in low pressure pipelines, this problem occurs in higher pressure pipelines as well. Water can fill the entire interior area of the pipe, forming a "slug" or "pocket", and can restrict service to large groups of customers, or travel down the service lines and damage end user equipment. Once a service has been restricted, in order to turn it back on, the utility company must locate and remove the water blockage from the main, gain access into each customer's home and check the integrity of the entire line prior to reinstating gas service.

Once water enters a main it is difficult to remove. In order to remove water from the mains, utility companies may excavate the ground to expose the pipe and tap a hole in the main to determine if water is present at the location of the excavation. If water is present, additional holes are tapped to determine the extent of the water located in the main. Once the extent is determined, a vacuum truck, designed to pump and store water, may be used to evacuate the mains via one of the tapped holes. Additional tapped holes may be necessary to evacuate all of the water if the lowest point in the pipe has not been exposed during excavation.

Another approach for water removal involves the utilization of a camera which is inserted into the main via one of the tapped holes. A camera provides a better means to locate the water in the pipe. Once the water is located using the camera, a second hole is tapped and a tube is fed into the second hole. The camera remains in the main and the tube is pushed to the camera. The tube is used to evacuate whatever water comes in contact with the end of the tube. Although this may be an improvement to operating blind, it has inherent, and rather severe, limitations. For example, even when using a camera, it can be extremely difficult for operators to accurately locate and place the tube directly in the water. It is also a matter of trial and error, and often luck, to position the end of the tube in the location that will yield the most effective pumping. The tube, which may be made of a light polymer tends to curl before it reaches the water, and therefore, even if the operator is fortunate enough to locate the tube at or near the site of the water incursion, the end of the tube may not be on the bottom of the pipe, or even in contact with the water. Moreover, making the second hole for the tube is time consuming and an additional expense. Indeed, the entire process of tapping a hole and inserting a camera to locate the water, tapping a second hole, inserting the tube, and finally removing the water—assuming the tube can be properly positioned—is time consuming and inefficient. Therefore, a need exists for a system to overcome these and other problems associated with existing devices.

SUMMARY

Embodiments of the present invention allow water to be located and removed much more efficiently and quickly than prior art systems. Embodiments may include a system for extracting liquid from a pipeline. The system may include a flexible elongate member having a first end and including a conduit having an intake port proximate the first end for receiving the liquid therein. A camera arrangement is attached to the first end of the flexible elongate member, and a connection arrangement is disposed between the camera arrangement and the first end of the flexible elongate member. The connection arrangement includes at least one opening in fluid communication with the intake port such that the liquid can pass through the opening and into the intake port.

Embodiments of the present invention may also include system for extracting liquid from a pipeline that includes a flexible elongate member as described above. The system may also include a camera arrangement disposed outward from the first end of the flexible elongate member. A connection arrangement connects the camera arrangement to the first end of the flexible elongate member and is configured to facilitate passage of the liquid therethrough and into the intake port.

Embodiments of the present invention may further include a method for producing a system for extracting liquid from a pipeline such as described above. The system may include a conduit arrangement having an intake port for receiving the liquid therein, a camera arrangement, and a connection arrangement configured to connect the camera arrangement to the conduit arrangement. The method may include extruding a conductor with the conduit arrangement such that at least a portion of the conductor is disposed within the conduit arrangement, and such that one end of the conductor is connectable to the camera arrangement and another end of the conductor is connectable to an output device.

DETAILED DESCRIPTION

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
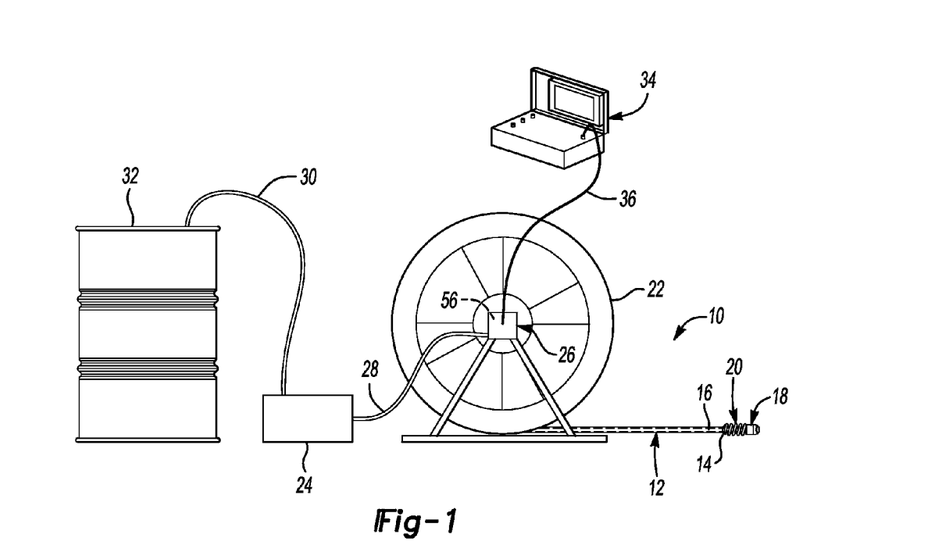
FIG. 1 shows a system in accordance with embodiments of the present invention.

FIG. 1 shows a system 10 in accordance with embodiments of the present invention. The system 10 is used for extracting liquid from a pipeline, such as water collected in a low-pressure gas main. The system 10 includes a flexible elongate member 12 having a first end 14 and including a conduit 16 for receiving and transferring the liquid out of the pipeline. The conduit 16 may be made from a polymer, such as polyethylene, and may be approximately 0.5 inches in diameter. This keeps the overall diameter of the flexible elongate member 12 relatively small so that it can be inserted into a small opening in a pipeline. Other materials and sizes of conduits that are effective for the given application may also be used. The system 10 also includes a camera arrangement 18 attached to the first end 14 of the flexible elongate member 12. The system 10 also includes a connection arrangement 20, which is disposed between the camera arrangement 18 and the first end 14 of the flexible elongate member 12. Also showing FIG. 1, is a reel 22 onto which the flexible elongate member 12 can be spooled.

Although the system 10 can be directly connected to other components such as a pump 24, in the embodiment shown in FIG. 1, it is connected to the pump 24 through a rotary union 26. A fluid line 28 connects the pump 24 to the rotary union 26, while another fluid line 30 connects the pump 24 to a barrel 32 for collecting the liquid pumped from the pipeline. Also shown in FIG. 1 is a connection between the system 10 and an output device 34, which, in the embodiment shown in FIG. 1 is a compact subsystem containing power supplies for the camera and lights, a variable light control, a video-out connector and a video monitor. The output device 34 is connected to the system 10 through data and power cable 36, which is also connected to the rotary union 26.

Figure 2:
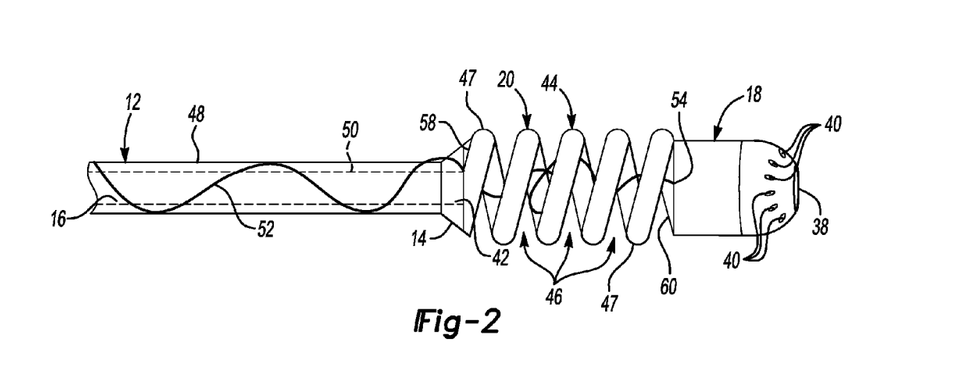
FIG. 2 shows details of a camera arrangement and a connection arrangement of the system shown in FIG. 1.

FIG. 2 shows a portion of the system 10 in detail. Specifically, it shows a portion of the flexible elongate member 12, the conduit 16 and the camera arrangement 18. The camera arrangement 18 includes a camera 38 and a plurality of LED's 40 used to illuminate an object viewable by the camera 38, which, in at least some applications, will be a pool of liquid in a pipeline. The camera 38, like all of the elements of the system 10 which are intended to enter a pipeline, can have a small minimum dimension—in this case a diameter—to ensure that the system 10 can enter pipelines through a very small opening—e.g., a 1.5 inch diameter opening. As explained below in conjunction with FIG. 8, this allows the system 10 to be used in live gas mains so that service does not need to be cut during the water extraction process.

Also shown in FIG. 2 is an intake port 42 in the conduit 16 located proximate the first end 14 of the flexible elongate member 12. The connection arrangement 20 includes a coil spring 44 that has a plurality of openings 46 between the coils 47, which allows liquid to pass through the connection arrangement 20 and into the intake port 42 of the conduit 16. By having the camera arrangement 18 disposed outward from the first end 14 of the flexible elongate member 12, and by having it connected with a connection arrangement having a plurality of openings, such as the coil spring 44, the system 10 is able to combine the features of visual inspection and liquid extraction. Specifically, one end 58 of the spring 44 is connected to the first end 14 of the flexible elongate member 12, while another end 60 of the spring 44 is connected to the camera arrangement 18. A screen, mesh or other porous material may be used in conjunction with the spring 44 to keep solid material from plugging the conduit 16. Other types of connection arrangements may also be used. For example, in place of the spring 44, a generally solid material with one or more openings to allow liquid to flow through to an intake port of a conduit can also be used.

The flexible elongate member 12 further includes a cover 48, which is disposed over at least a portion of an outside surface 50 of the conduit 16. The system 10 also includes a conductor 52, which, in the embodiment shown in FIG. 2, is a flat flexible cable capable of transferring power and data between the camera arrangement 18 and an output device, such as the subsystem 34 shown in FIG. 1. As shown in FIG. 2, one end 54 of the conductor 52 is attachable to the camera arrangement 18 while another end 56—see FIG. 1—is connected to the output device 34 through the rotary union 26 and the additional cable 36. For much of its length, the conductor 52 is disposed between the cover 48 and the outside surface 50 of the conduit 16. This helps to protect it as the flexible elongate member 12 travels through a pipeline. Once it exits from beneath the cover 48 and travels to the camera arrangement 18 where it is terminated, the conductor 52 is further protected by the connection arrangement 20, and in particular, the spring 44. In other embodiments, a wireless camera may be used, especially one operating at 900 MHz or above, which may be necessary to get a signal through the cast iron pipes used for many gas mains.

Figure 3:
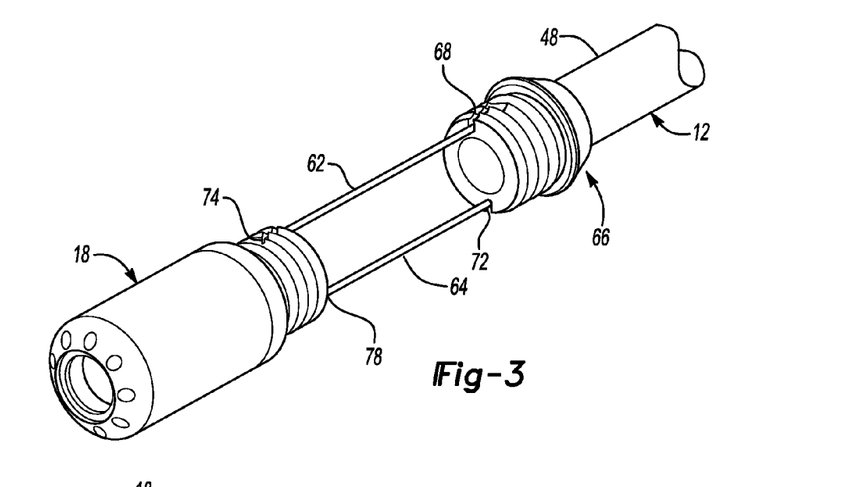
FIG. 3 shows further details of the system shown in FIG. 1.
Figure 4:
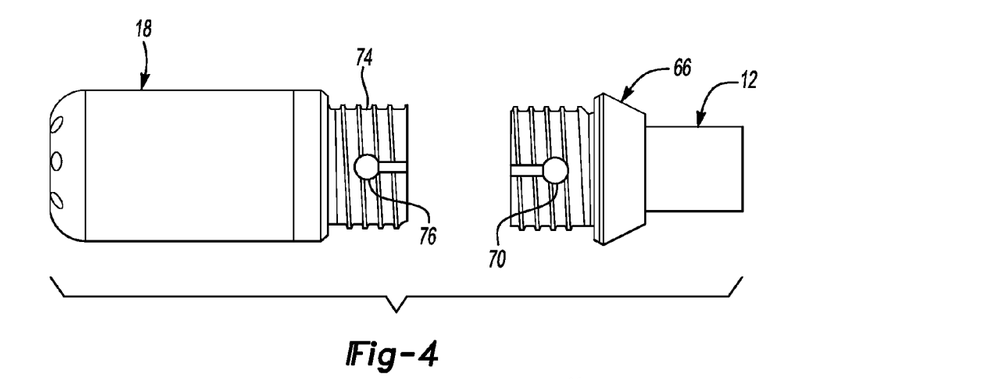
FIG. 4 shows a side view of a camera arrangement and conduit of the system shown in FIG. 1.

FIG. 3 shows a portion of the system 10 including the camera arrangement 18 and a portion of the flexible elongate member 12. Shown with the spring 44 removed from the connection arrangement, two tie members 62, 64 are shown connecting the flexible elongate member 12 and the camera arrangement 18. Specifically, a transition member 66 is attached to the conduit 16, either to the outer surface 50, or as shown in FIG. 3 to the cover 48. The transition member 66 includes a plurality of threads 68 configured to receive coils 47 proximate one end 58 of the spring 44. The tie members 62, 64 are attached to the transition 68 member 66 through apertures. For example, one end 72 of the tie member 64 is attached to the transition member 66 through an aperture 70 shown in FIG. 4, it being understood that a similar aperture is located on the opposite side of the transition member 66 for attachment of the tie member 62. A portion of the camera arrangement 18 is configured similarly to the transition member 66. In particular, a plurality of threads 74 are configured to receive coils 47 proximate the other end 60 of the spring 44, and an aperture 76 (see FIG. 4) is configured to receive the other end 78 of the tie member 64.

One of the purposes of the tie members 62, 64 shown in FIG. 3 is to ensure that the spring 44 is not stretched too far when the system 10 is being inserted into and removed from a pipeline. Therefore, the tie members 62, 64 are made from an inextensible material so as to limit any extension of the spring 44. As used herein, "inextensible" does not mean that the tie members 62, 64 are made from a material that has no capacity to stretch regardless of the force applied; rather, it includes materials that may elongate a small amount in the presence of a large tensile force, but which are significantly less extensible than the spring 44. Therefore, the tie members 62, 64 may be made from metal, or from a polymer or other material that serves the intended purpose. As noted above, a connection arrangement, such as the connection arrangement 20, need not include a spring. In some embodiments, one or more tie members, such as the tie members 62, 64 may be used in place of a spring.

Figure 5:
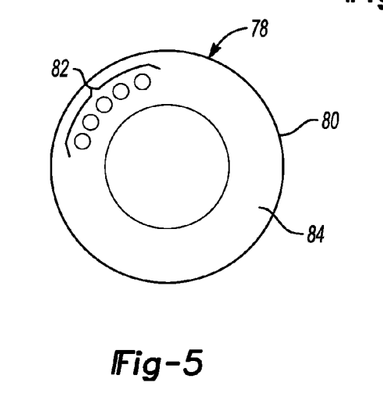
FIG. 5 shows an end view of a conduit and conductor of the system shown in FIG. 1.
Figure 6:
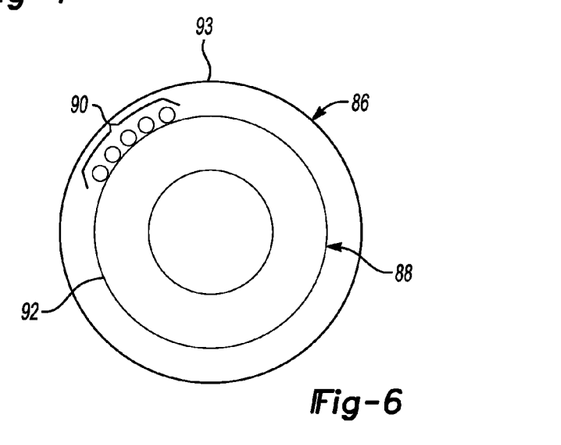
FIG. 6 shows an end view of a conduit having a protective covering with the conductor underneath.

Embodiments of the invention also include a method for producing a system, such as the system 10 described and illustrated above. The method may include, for example, the step of extruding a conductor with a conduit arrangement such that at least a portion of the conductor is disposed within the conduit arrangement. FIG. 5 shows a conduit arrangement 78 that includes a conduit 80 and a conductor 82, such as a five-wire flat flexible cable, wherein the conductor 82 has been extruded into a wall 84 of the conduit 80. This provides protection for the conductor and allows it to safely be attached to a camera arrangement, for example the camera arrangement 18, on one end and an output device such as the subsystem 34 on the other end. FIG. 6 shows a conduit arrangement 86 configured similarly to the conduit 16 and cover 40 described in conjunction with the system 10. The conduit arrangement 86 includes a conduit 88 having outside surface 92 and a cover or jacket 93 disposed around the outside surface 92. A conductor 90, which is also in this illustration a five-wire flat flexible cable, is not disposed within a wall of the conduit 88, but rather is located between the jacket 93 and the outside surface 92 of the conduit 88. This can be achieved by extruding or "overmolding" the jacket 93 over the conduit 88 and the conductor 90.

Figure 7:
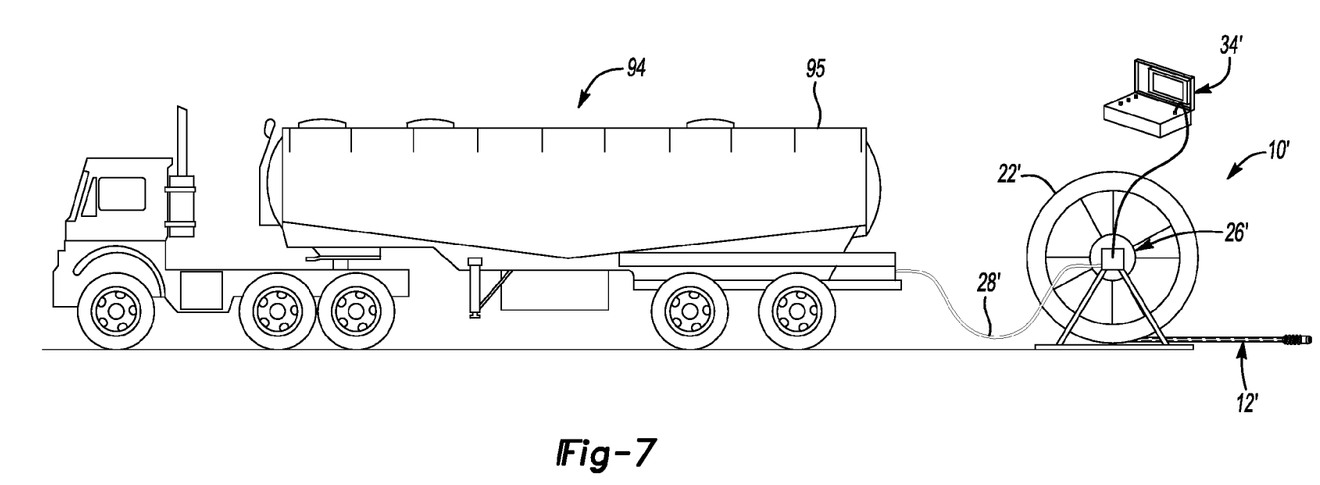
FIG. 7 shows a system in accordance with embodiments of the present invention used in conjunction with a vacuum truck.
Figure 8:
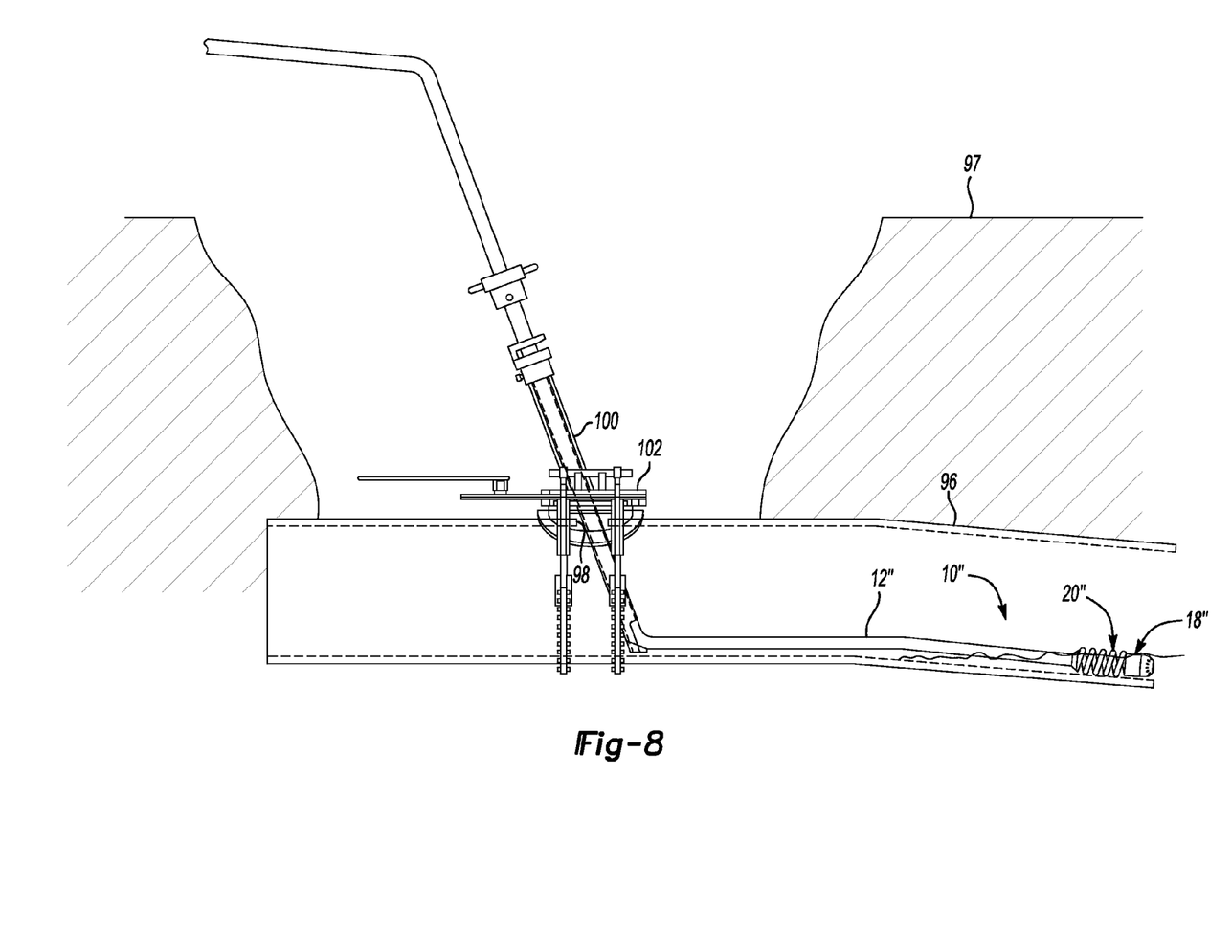
FIG. 8 shows a system in accordance with embodiments of the present invention used in conjunction with a launch tube to allow access to a live gas main.

FIG. 7 shows a system 10' in accordance with an embodiment of the present invention, where the prime symbol (') is used to denote elements similar to those shown above in conjunction with the system 10. In this embodiment, the fluid line 28' is not connected to a separate pump, but rather is connected to a vacuum truck 94 which is capable of pulling the water out of a pipeline through the system 10, and storing it in its self-contained tanker 95. FIG. 8 shows another system 10" where the double prime symbol (") is also used to denote elements similar to those with the same number labels shown and described above. As shown in FIG. 8, the camera arrangement 18" is disposed in a pipeline 96 well below a surface 97 of the ground.

One of the advantages of embodiments of the present invention is that it can enter a pipeline, such as the pipeline 96 through a very small opening—see the opening 98 in FIG. 8, which may be no more than 1.5 inches in diameter. Also shown in FIG. 8 is the system 10" being used in conjunction with a launch tube 100 of the type that is described in U.S. Pat. No. 7,551,197B2 entitled "Pipeline Inspection System", and issued on 23 Jun. 2009, which is incorporated herein by reference. The launch tube 100 not only works in conjunction with a saddle valve 102 to allow entry of the system 10" into the pipeline 96 without shutting off the gas, but also provides a smooth transition for the camera arrangement 18" as it changes direction from nearly vertical to nearly horizontal. Thus, not only do embodiments of the present invention provide the advantages of a combination of visual inspection and water extraction, they also allow water extraction to take place from a live gas main with little or no gas escape.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for extracting liquid from a pipeline, comprising:
   a flexible elongate member having a first end and including a conduit having an intake port proximate the first end for receiving the liquid therein;
   a camera arrangement attached to the first end of the flexible elongate member; and
   a connection arrangement disposed between the camera arrangement and the first end of the flexible elongate member, and including at least one opening in fluid communication with the intake port such that the liquid can pass through the opening and into the intake port, the connection arrangement including a coil spring having one end connected to the first end of the flexible elongate member and another end connected to the camera arrangement, and a tie member connected between the flexible elongate member and the camera arrangement, the tie member being substantially inextensible, thereby providing a limit to extension of the spring, and
   wherein the flexible elongate member further includes a transition member connected to the conduit and including a plurality of threads configured to receive coils proximate one end of the spring, and an aperture disposed therein for receiving one end of the tie member, the camera arrangement including a plurality of threads configured to receive coils proximate another end of the spring, and an aperture disposed therein for receiving another end of the tie member.

2. The system of claim 1, wherein the flexible elongate member further includes a cover disposed over at least a portion an outside surface of the conduit, the system further comprising a conductor at least a portion of which is disposed between the cover and the outside surface of the conduit, one end of the conductor being connectable to the camera arrangement and another end of the conductor being connectable to an output device.

3. The system of claim 2, wherein the camera arrangement includes a camera and at least one light positioned to illuminate an object viewable by the camera, and
   wherein a portion of the conductor is disposed through the connection arrangement and transfers power and data between the camera arrangement and the output device.

4. A system for extracting liquid from a pipeline, comprising:
   a flexible elongate member having a first end and including a conduit having an intake port proximate the first end for receiving the liquid therein;
   a camera arrangement disposed outward from the first end of the flexible elongate member; and
   a connection arrangement connecting the camera arrangement to the first end of the flexible elongate member and including a coil spring connected to the flexible elongate member and the camera arrangement, and having spaced-apart coils forming a continuous helical opening to allow liquid to enter between the coils at any radial position around the connection arrangement, the connection arrangement further including a tie member connected between the flexible elongate member and the camera arrangement, the tie member being substantially inextensible, thereby providing a limit to extension of the spring, and
   wherein the flexible elongate member further includes a transition member connected to the conduit and including: a plurality of threads configured to receive coils proximate one end of the spring, and an aperture disposed therein for receiving one end of the tie member, the camera arrangement including a plurality of threads configured to receive coils proximate another end of the spring, and further including an aperture disposed therein for receiving another end of the tie member.

5. The system of claim 4, further comprising a conductor disposed along a length of the flexible elongate member, one end of the conductor being connectable to the camera arrangement and another end of the conductor being connectable an output device at another end.

6. The system of claim 5, wherein a portion of the conductor is disposed through the connection arrangement and transfers power and data between the camera arrangement and the output device.

7. The system of claim 4 further comprising a pump connected to the conduit for pumping the liquid out of the pipeline through the conduit.

8. A method for producing a system for extracting liquid from a pipeline, the system including a conduit arrangement having a transition member and a conduit with an intake port for receiving the liquid therein, a camera arrangement, and a connection arrangement including a substantially inextensible tie member and a spring having spaced-apart coils forming a continuous helical opening to allow liquid to enter between the coils at any radial position around the connection arrangement, the connection arrangement being configured to connect the camera arrangement to the conduit arrangement, the camera arrangement including a plurality of threads configured to receive coils of the spring, and further including an aperture disposed therein for receiving an end of the tie member, the method comprising:

disposing a conductor proximate a wall of the conduit such that at least a portion of the conductor is disposed: within a wall of the conduit or on a portion of an outside surface of a wall of the conduit, and such that one end of the conductor is connectable to the camera arrangement and another end of the conductor is connectable to an output device;

connecting the tie member between the camera arrangement and the conduit arrangement; and connecting the spring between the camera arrangement and the conduit arrangement, including: disposing coils of the spring onto the threads of the camera arrangement, and connecting one end of the spring to the transition member.

9. The method of claim 8, further comprising disposing a cover over at least a portion of the conductor and the outside surface of the conduit.

10. The method of claim 8, wherein the step of disposing a conductor proximate a wall of the conduit includes extruding the conduit and the conductor together such that the at least a portion of the conductor is disposed within the wall of the conduit.

11. The system of claim 1, wherein the flexible elongate member further includes a conductor disposed within a wall of the conduit.

12. The system of claim 1, wherein the flexible elongate member further includes a conductor disposed outside a wall of the conduit, and a cover disposed over at least a portion of the conductor and at least a portion of the conduit.

* * * * *

UNITED STATES PATENT AND TRADEMARK OFFICE
CERTIFICATE OF CORRECTION

PATENT NO.        : 9,328,858 B2                         Page 1 of 1
APPLICATION NO.   : 13/846241
DATED             : May 3, 2016
INVENTOR(S)       : G. Gregory Penza et al.

It is certified that error appears in the above-identified patent and that said Letters Patent is hereby corrected as shown below:

In the claims

Column 6, Lines 24-25, Claim 2:

After "disposed over at least a portion"
Insert -- of --

Column 7, Lines 1-2, Claim 5:

After "conductor being connectable"
Insert -- to --

Signed and Sealed this
Twelfth Day of July, 2016

Michelle K. Lee
*Director of the United States Patent and Trademark Office*